US010060170B2

(12) United States Patent
Gómez Melchor et al.

(10) Patent No.: US 10,060,170 B2
(45) Date of Patent: Aug. 28, 2018

(54) VEHICLE WITH ACTIVE DOOR ZONE

(71) Applicant: Ford Global Technologies, LLC, Dearborn, MI (US)

(72) Inventors: Jorge Gómez Melchor, Mexico City (MX); Jesús Marini Parissi, Ciudad de México (MX); Oscar Saavedra, Toluca (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/237,514

(22) Filed: Aug. 15, 2016

(65) Prior Publication Data

US 2018/0044963 A1    Feb. 15, 2018

(51) Int. Cl.
*E05F 15/40* (2015.01)
*E05F 5/00* (2017.01)
*B60J 5/04* (2006.01)

(52) U.S. Cl.
CPC ............. *E05F 15/40* (2015.01); *B60J 5/0493* (2013.01); *E05F 5/00* (2013.01); *E05Y 2201/21* (2013.01); *E05Y 2201/232* (2013.01); *E05Y 2201/246* (2013.01); *E05Y 2400/20* (2013.01); *E05Y 2400/44* (2013.01); *E05Y 2900/531* (2013.01)

(58) Field of Classification Search
CPC . E05F 15/40; E05F 5/00; B60J 5/0493; E05Y 2201/21; E05Y 2201/232; E05Y 2201/246; E05Y 2900/531
USPC .......................................................... 701/49
See application file for complete search history.

(56) References Cited

U.S. PATENT DOCUMENTS

| 5,140,316 A | * | 8/1992 | DeLand | ..................... B60J 5/06 180/271 |
| 5,189,839 A | * | 3/1993 | DeLand | ..................... B60J 5/06 49/280 |
| 5,216,838 A | * | 6/1993 | DeLand | ..................... B60J 5/06 49/280 |
| 5,239,779 A | * | 8/1993 | DeLand | ..................... B60J 5/06 49/360 |
| 5,350,986 A | * | 9/1994 | Long | ....................... E05F 15/41 318/266 |

(Continued)

FOREIGN PATENT DOCUMENTS

| CN | 203242181 U | 10/2013 |
| CN | 104097601 A | 10/2014 |

(Continued)

OTHER PUBLICATIONS

Unpublished pending U.S. Appl. No. 14/991,496, filed Jan. 8, 2016 which is not being furnished herewith, pursuant to the Commissioner's Notice dated Sep. 21, 2004.

(Continued)

*Primary Examiner* — Atul Trivedi
(74) *Attorney, Agent, or Firm* — James P. Muraff; Neal, Gerber & Eisenberg LLP (57) ABSTRACT

A vehicle includes: a frame, a rotatable door; an inhibitor comprising: an arm extending through a selective gate including: upper and lower springs respectively biasing upper and lower rollers against the arm; upper and lower stoppers configured to, upon activation, compress the upper and lower rollers against the arm, thus stopping rotation of the door; sensors, processor(s) configured to: activate and deactivate the stoppers based on sensed events.

20 Claims, 7 Drawing Sheets

(56) References Cited

U.S. PATENT DOCUMENTS

| | | | |
|---|---|---|---|
| 5,396,158 A * | 3/1995 | Long | H02H 7/0851 |
| | | | 318/266 |
| 6,441,512 B1 * | 8/2002 | Jakel | E05B 77/48 |
| | | | 307/10.2 |
| 7,193,509 B2 | 3/2007 | Bartels | |
| 7,280,035 B2 | 10/2007 | McLain | |
| 7,500,711 B1 | 3/2009 | Ewing | |
| 7,528,704 B2 | 5/2009 | Das | |
| 7,586,402 B2 | 9/2009 | Bihler | |
| 7,908,060 B2 | 3/2011 | Basson et al. | |
| 8,180,547 B2 | 5/2012 | Prasad et al. | |
| 8,319,620 B2 | 11/2012 | Usher et al. | |
| 8,571,824 B2 * | 10/2013 | Okumura | B62D 65/06 |
| | | | 700/213 |
| 8,620,549 B2 | 12/2013 | Nickolaou et al. | |
| 9,759,004 B2 * | 9/2017 | Uno | E05B 81/06 |
| 2001/0022049 A1 * | 9/2001 | Clark | B60J 5/06 |
| | | | 49/360 |
| 2002/0066158 A1 * | 6/2002 | Breed | E05C 17/203 |
| | | | 16/64 |
| 2002/0189168 A1 * | 12/2002 | Sicuranza | E05C 17/00 |
| | | | 49/26 |
| 2003/0093873 A1 * | 5/2003 | Linnenbrink | E05D 11/081 |
| | | | 16/85 |
| 2003/0163895 A1 | 9/2003 | Liang et al. | |
| 2004/0049323 A1 | 3/2004 | Tijerina | |
| 2004/0055110 A1 * | 3/2004 | Breed | E05C 17/203 |
| | | | 16/82 |
| 2004/0095250 A1 | 5/2004 | Chapman | |
| 2004/0252020 A1 | 12/2004 | Matsumoto | |
| 2004/0262945 A1 * | 12/2004 | Suzuki | E05B 65/0811 |
| | | | 296/155 |
| 2005/0134084 A1 * | 6/2005 | Rangnekar | E05D 3/127 |
| | | | 296/146.11 |
| 2005/0269984 A1 * | 12/2005 | Piechowiak | E05F 15/41 |
| | | | 318/445 |
| 2006/0187304 A1 | 8/2006 | Sakata | |
| 2006/0267321 A1 | 11/2006 | Harish | |
| 2007/0050110 A1 | 3/2007 | Kondoh | |
| 2007/0244641 A1 | 10/2007 | Altan | |
| 2008/0100092 A1 * | 5/2008 | Gao | E05F 15/60 |
| | | | 296/146.11 |
| 2008/0120911 A1 * | 5/2008 | Browne | E05B 47/0009 |
| | | | 49/352 |
| 2008/0218381 A1 | 9/2008 | Buckley | |
| 2009/0033477 A1 | 2/2009 | Illium et al. | |
| 2009/0115366 A1 * | 5/2009 | Mullet | E05F 15/41 |
| | | | 318/466 |
| 2011/0032119 A1 | 2/2011 | Pfeiffer | |
| 2011/0169626 A1 | 7/2011 | Sun | |
| 2012/0293313 A1 | 11/2012 | Yu | |
| 2013/0099523 A1 * | 4/2013 | Brown | B60J 5/0473 |
| | | | 296/146.9 |
| 2013/0153324 A1 * | 6/2013 | Kissel, Jr. | B62D 21/152 |
| | | | 180/253 |
| 2013/0342330 A1 | 12/2013 | Kiefer | |
| 2014/0098230 A1 | 4/2014 | Baur | |
| 2014/0207344 A1 * | 7/2014 | Ihlenburg | E05F 15/73 |
| | | | 701/49 |
| 2014/0257659 A1 | 9/2014 | Dariush | |
| 2015/0059250 A1 * | 3/2015 | Miu | E05F 15/611 |
| | | | 49/349 |
| 2015/0120150 A1 * | 4/2015 | Kreder | B60N 2/06 |
| | | | 701/49 |
| 2015/0246639 A1 | 9/2015 | Nagata et al. | |
| 2015/0309562 A1 | 10/2015 | Shams et al. | |
| 2015/0355711 A1 | 12/2015 | Rihn | |
| 2016/0236547 A1 * | 8/2016 | Wojdyla | B60J 5/047 |
| 2017/0218678 A1 * | 8/2017 | Kothari | E05F 15/73 |
| 2017/0260790 A1 | 9/2017 | Sauerwein et al. | |
| 2017/0260792 A1 * | 9/2017 | Torres Fernandez | E05F 15/40 |
| 2017/0292311 A1 * | 10/2017 | Podkopayev | E05F 15/622 |
| 2017/0361839 A1 | 12/2017 | Bidner | |
| 2018/0038146 A1 * | 2/2018 | Linden | E05F 15/611 |
| 2018/0044963 A1 | 2/2018 | Gomez Melchor | |

FOREIGN PATENT DOCUMENTS

| | | |
|---|---|---|
| CN | 204077568 U | 1/2015 |
| CN | 103010139 B | 3/2015 |
| CN | 204210378 U | 3/2015 |
| CN | 105196953 A | 12/2015 |
| DE | 102004049054 A1 | 4/2006 |
| DE | 102004049504 A1 | 4/2006 |
| DE | 102005014581 A1 | 9/2006 |
| DE | 102008050685 A1 | 4/2010 |
| DE | 102014011121 A1 | 1/2016 |
| JP | H04166579 A | 6/1992 |
| JP | 2017159744 A | 9/2017 |
| KR | 1020140036367 A1 | 3/2014 |

OTHER PUBLICATIONS

Unpublished pending U.S. Appl. No. 15/186,850, which is not being furnished herewith, pursuant to the Commissioner's Notice dated Sep. 21, 2004.

Unpublished pending U.S. Appl. No. 14/972,761, which is not being furnished herewith, pursuant to the Commissioner's Notice dated Sep. 21, 2004.

*Jaguar Unveils Bike Sense: New Cars Will Alert Drivers to Cyclists*, 5 Pages.

Search Report dated Feb. 1, 2018, for GB Patent Application No. 1712959.4 (4 pages).

Search Report dated Oct. 19, 2017, for GB Patent Application No. 1706487.4 (4 pages).

Christopher Nebolsky, Haptic Blind Spot Alerr System, Spring 2013 Haptics Class Project Paper presented at the University of South Florida, Apr. 29, 2013, (16 Pages).

Introduction to Haptic Feedback, 2015, England (8 Pages).

William (Skip) Outcalt, Centerline Rumble Strips, Report No. CDOT-DTD-R-2001-8, Department of Transportation Research, Aug. 2001, Denver, Colorado (15 Pages).

Bahador Saket et ai, Designing an Effective Vibration-Based Notification Interface for Mobile Phones, School of Computing, National University of Singapore, Singapore, (11 Pages).

Christophe Tandonnet et ai, Tactile Stimulations and Wheel Rotation Responses: Toward Augmented Lane Deparrure Warning Systems, Frontiers in Psychology, Oct. 2014, (11 Pages).

Doppler Effect, Wikipedia, the Free Encyclopedia, (10 Pages).

Kal Kaur, Vehicle Crash Sensors: Blind Spot Detection, (3 Pages).

Mike Duff, Jaguar Land Rover Demos "Instinctive" Bicycle and Motorcycle Warning System, Jan. 20, 2015, http://blog.caranddriver.com/jaguarlandroverdemosinstinctivebicycleandmotorcyclewarningsystemwvideo/.

Unpublished pending U.S Appl. No. 15/186,850, which is not being furnished herewith pursuant to the Commissioner's Notice dated Sep. 21, 2004.

* cited by examiner

Prior Art

FIG. 4

Prior Art

VEHICLE WITH ACTIVE DOOR ZONE

TECHNICAL FIELD

This disclosure relates to automated control of vehicle doors.

BACKGROUND

Objects, such as bicycles, may collide with vehicle doors. A solution is needed to prevent or discourage collision between bicycles and vehicle doors.

SUMMARY

A vehicle includes: a frame, a rotatable door; an inhibitor comprising: an arm extending through a selective gate including: upper and lower springs respectively biasing upper and lower rollers against the arm; upper and lower stoppers configured to, upon activation, compress the upper and lower rollers against the arm, thus stopping rotation of the door; sensors, processor(s) configured to: activate and deactivate the stoppers based on sensed events.

According to some embodiments, the door is configured to rotate and pivot about the frame; wherein the inhibitor is configured to rotate and pivot about the frame; wherein the selective gate is fixed to the door.

According to some embodiments, the upper stopper comprises: (a) an upper linear motor or solenoid, (b) an upper vertical actuator, and (c) an upper brake.

According to some embodiments, the upper vertical actuator extends through a central axis of the upper spring when the upper stopper is active.

According to some embodiments, upon activation of the upper stopper, the upper linear motor or solenoid extends the upper vertical actuator downward, which drives the upper brake against the upper roller.

According to some embodiments, upon activation of the upper stopper, the upper stopper drives the upper brake against the upper roller until the upper stopper is deactivated.

According to some embodiments, the lower stopper comprises: (a) a lower linear motor or solenoid, (b) a lower vertical actuator, and (c) a lower brake.

A vehicle includes: a rotatable door, an inhibitor comprising: upper and lower stoppers configured to, upon activation, compress upper and lower rollers against an arm, thus stopping rotation of the door; sensors, processor(s) configured to: activate and deactivate the stoppers based on sensed events.

According to some embodiments, the processor(s) are configured to: determine that a calculated trajectory of a detected object intersects the door; activate the stoppers based on the determination.

According to some embodiments, the processor(s) are configured to: determine the intersection of the trajectory of the detected object with the door based on a sweeping position of the door.

According to some embodiments, the sweeping position of the door is arced and includes a closed position of the door, a fully open position of the door and intermediate positions of the door.

According to some embodiments, the processor(s) are configured to: determine that the door is active with reference to seatbelt sensor(s) or seat load sensor(s); only calculate the trajectory of the detected object with reference to the door when the door is determined active.

According to some embodiments, the door is a driver door and the inhibitor is a driver door inhibitor, the vehicle comprises a passenger door connected to a passenger door inhibitor, and the processor(s) are configured to: determine that the passenger door is active with reference to passenger seatbelt sensor(s) or passenger seat load sensor(s); determine that a calculated trajectory of a detected object intersects the passenger door, but only when the passenger door is active; activate stoppers of the passenger door inhibitor based on the determination.

According to some embodiments, the processor(s) are configured to: measure load applied against the stoppers; deactivate the stoppers when the measured load exceeds a predetermined value a predetermined number of times.

Disclosed is a method of stopping a rotatable door of a vehicle including sensors, the door and an inhibitor having: upper and lower stoppers configured to, upon activation, compress upper and lower rollers against an arm, thus stopping rotation of the door; the method comprising, via processor(s) of the vehicle: activating and deactivating the stoppers based on sensed events.

According to some embodiments, the method comprises: determining that a calculated trajectory of a detected object intersects a sweeping position of the door; activating the stoppers based on the determination.

According to some embodiments, the sweeping position of the door is arced and includes a closed position of the door, a fully open position of the door and intermediate positions of the door.

According to some embodiments, the method comprises: determining that the door is active with reference to seatbelt sensor(s) or seat load sensor(s); only calculating the trajectory of the detected object with reference to the door when the door is determined active.

According to some embodiments, the door is a driver door and the inhibitor is a driver door inhibitor, the vehicle includes a passenger door connected to a passenger door inhibitor, and the method comprises: determining that the passenger door is active with reference to passenger seatbelt sensor(s) or passenger seat load sensor(s); determining that a calculated trajectory of a detected object intersects the passenger door, but only when the passenger door is active; activating stoppers of the passenger door inhibitor based on the determination.

According to some embodiments, the method comprises: measuring load applied against the stoppers; deactivating the stoppers when the measured load exceeds a predetermined value a predetermined plurality of times.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
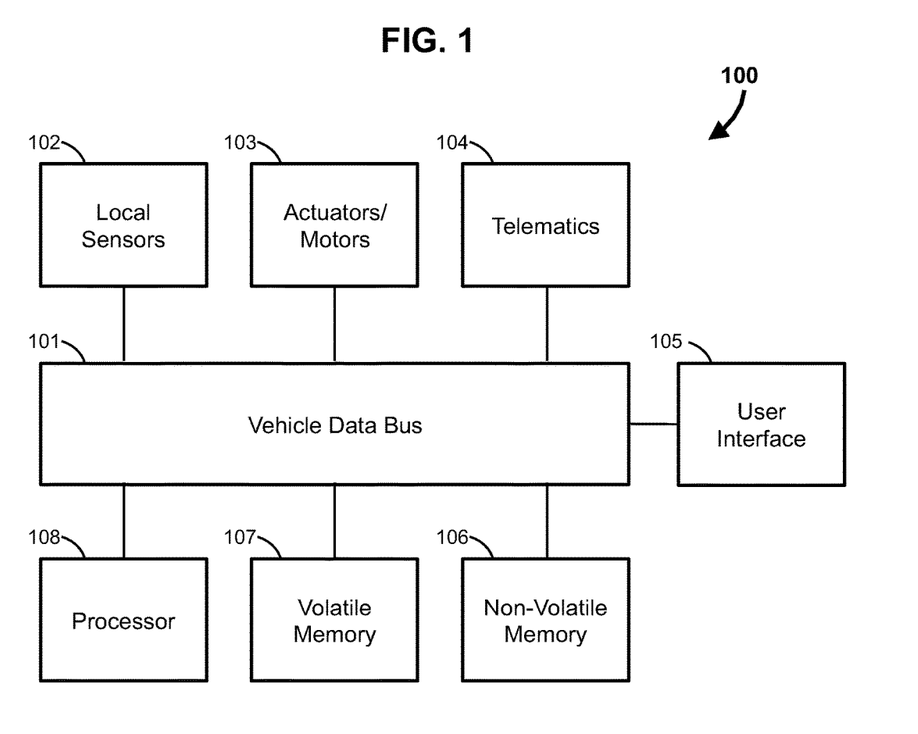
FIG. 1 is a block diagram of a vehicle computing system.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. The vehicle 200 includes a plurality of doors 400 to 403. Vehicles are also described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie") and U.S. patent application Ser. No. 14/972,761 to Hu et al. ("Hu"), all of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency.

The actuators/motors 103 produce physical results. Examples of actuators/motors include fuel injectors, windshield wipers, brake light circuits, transmissions, airbags, engines, power train motors, steering, the upper and lower stoppers 304, 305 (discussed below), etc. The local sensors 102 transmit digital readings or measurements to the processor 108. Examples of suitable sensors include temperature sensors, rotation sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
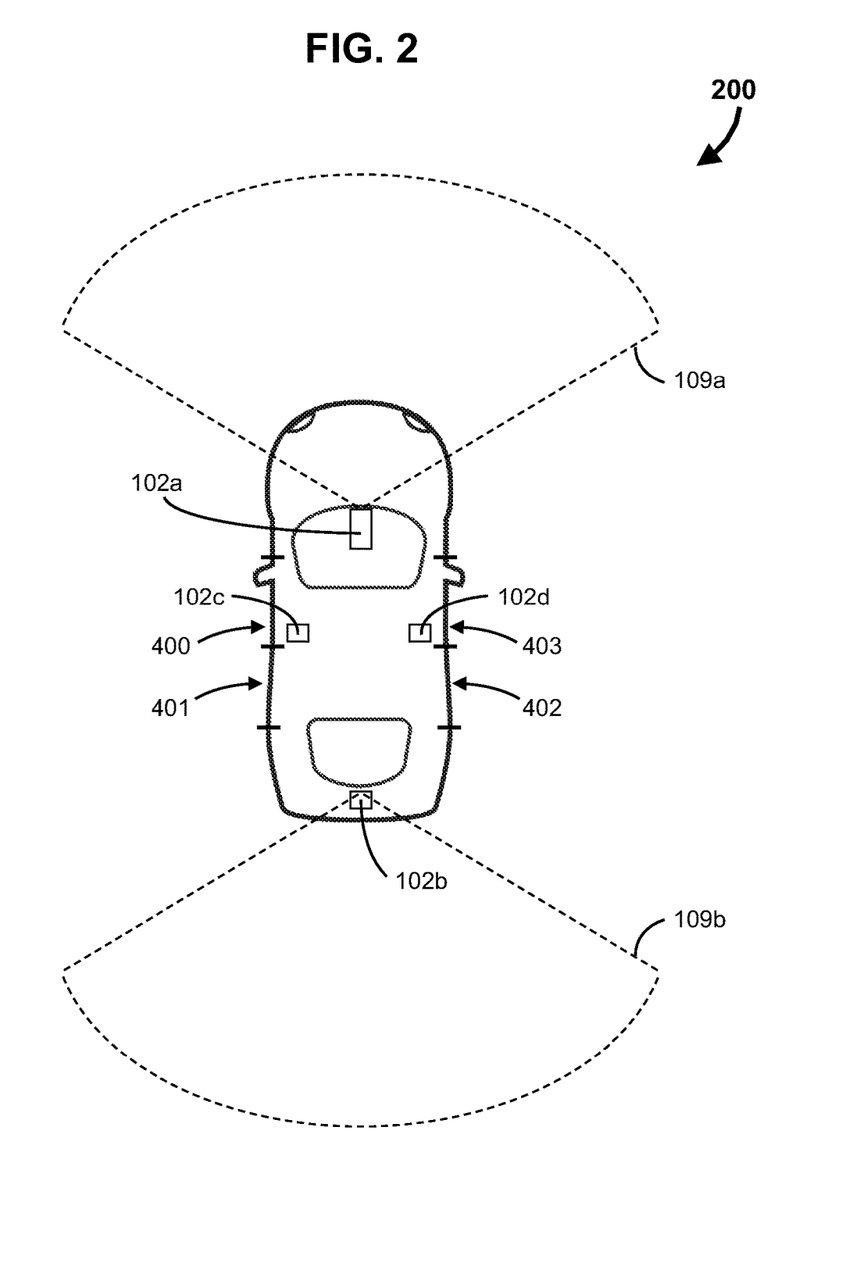
FIG. 2 is a top plan view of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200. Local sensor 102b may be an ultrasonic sensor, a lidar sensor, a camera, a video camera, and/or a microphone, etc. Local sensor 102b may be configured to detect objects trailing the vehicle 200 as indicated by trailing sensing range 109b. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 perform some or all of the methods and operations discussed below.

According to various embodiments, the vehicle 200 includes some or all of the features of the vehicle 100a of Prasad. According to various embodiments, the computing system 100 includes some or all of the features of the VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122. According to various embodiments, the vehicle 200 is the vehicle 14 of Hu and the computing system 100 includes some or all of the features of the trailer backup assist system 10 shown in FIG. 2 of Hu.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Figure 3A:
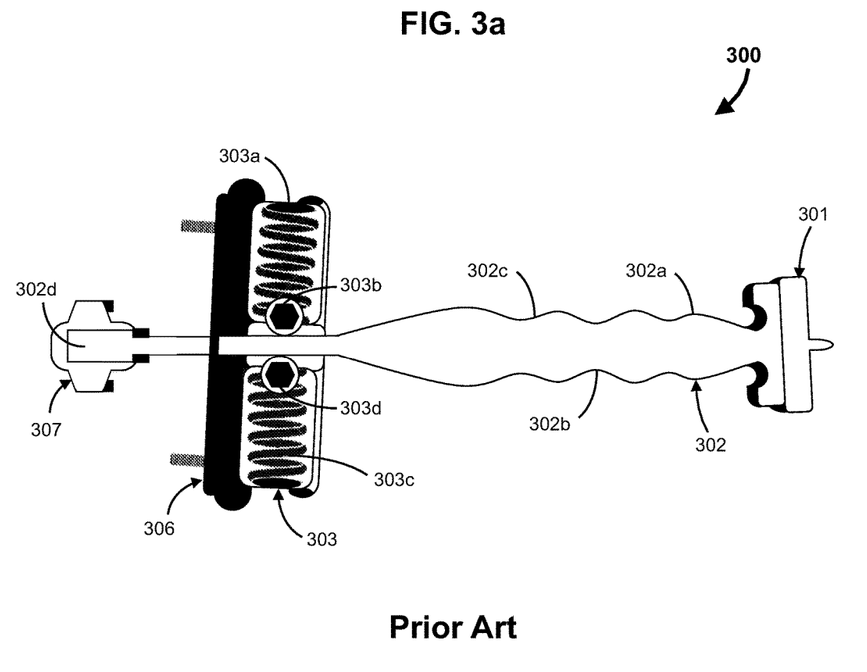
FIG. 3a is a side view of a prior art inhibitor with a selective gate shown in cross section.

Referring now to FIG. 3a, a prior art door rotation selective inhibitor ("the inhibitor") 300 is generally shown and illustrated. The inhibitor 300 is configured to (a) provide smooth rotation (i.e., opening) of the door, (b) enable the door to open or rotate to a plurality of predefined resting positions, (c) prevent the door from opening or rotating by more than a predetermined degree (i.e., stop the door at its maximum open position).

Figure 4:
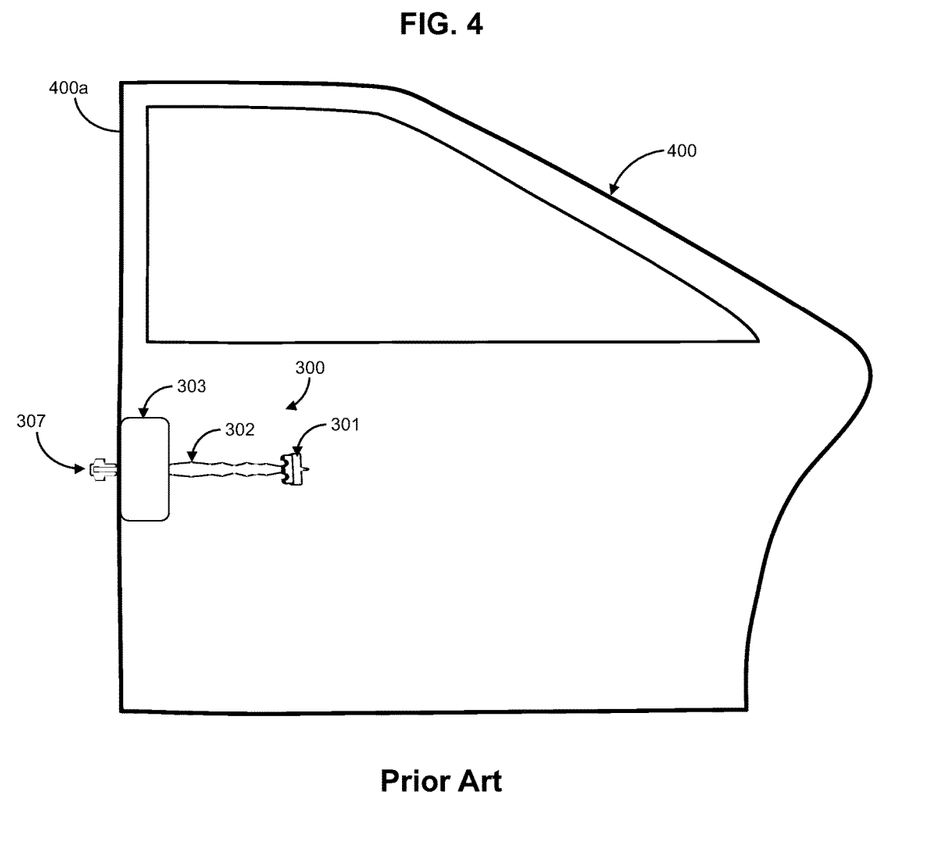
FIG. 4 is a prior art schematic of the inhibitor attached to a door.

To this end, one inhibitor 300 is mounted on each of the plurality of doors 400 to 403. FIG. 4 generally shows and illustrates the inhibitor being mounted in the driver door 400. The arrangement of FIG. 4 is prior art. A frame connector 307 of the inhibitor is fixed to a structural base frame of the vehicle 200 (i.e., the frame connector 307 is not fixed to the door 400). A selective gate 303 of the inhibitor 300 is fixed to an interior surface of the door 400 and thus moves with the door 400. An arm 302 and stop 301 of the inhibitor 300 are free-floating (i.e., are not directly fixed to the door 400 or the frame of the vehicle). The arm 302 pivots (i.e., rotates) about the frame connector 307 at pivot bearing 302d.

FIG. 3a generally shows and illustrates the prior art inhibitor 300 in greater detail. As discussed above, the inhibitor 300 includes (a) the stop 301, (b) the arm 302, (c) the selective gate 303, (d) the frame connector 307, and (e) a mount 306. Although not shown in FIG. 4, the mount 306 fixes the selective gate 303 to an inner surface of the door 400. In FIG. 4, the mount 306 would connect the selective gate 303 to the left surface 400a of the door 400.

With reference to FIG. 3a, and as is known in the art, the arm 302 laterally slides through the selective gate 303. The selective gate 303 includes an upper spring 303a that biases an upper roller 303b downward against the arm 302 and a lower spring 303c that biases a lower roller 303d upward against the arm 302.

As shown in FIG. 3a, the arm 302 includes a plurality of valleys (e.g., first valley 302a, second valley 302b, and third valley 302c). The valleys 302a to 302c represent intermediate resting positions of the door 400. More specifically, the valleys 302a to 302c enable the springs 303a and 303c to occupy low energy states. The valleys 302a to 302c thus discourage the door 400 from further rotation and encourage the door 400 to rest at the intermediate location associated with the valley. For example, as the door opens, the rollers 303b and 303d may occupy valley 302b. Because valley 302b is vertically thinner than the adjacent portions of the arm 302, the springs 303a and 303c will relax when the rollers 303b and 303d sit in valley 302b. Valley 302b thus encourages the door to stop at an intermediate (i.e., partially open and partially closed) resting position. If a user applies sufficient additional force to the door, the arm 302 will continue to slide through the selective gate 303, forcing the springs 303a and 303c to retract and enable the rollers 303b and 303d to contact a new position on the arm 302. When the frame connector 307 abuts against the selective gate 303, the door reaches its fully closed position and when the stop 301 abuts against the selective gate 303, the door 400 reaches its fully opened position.

Figure 3B:
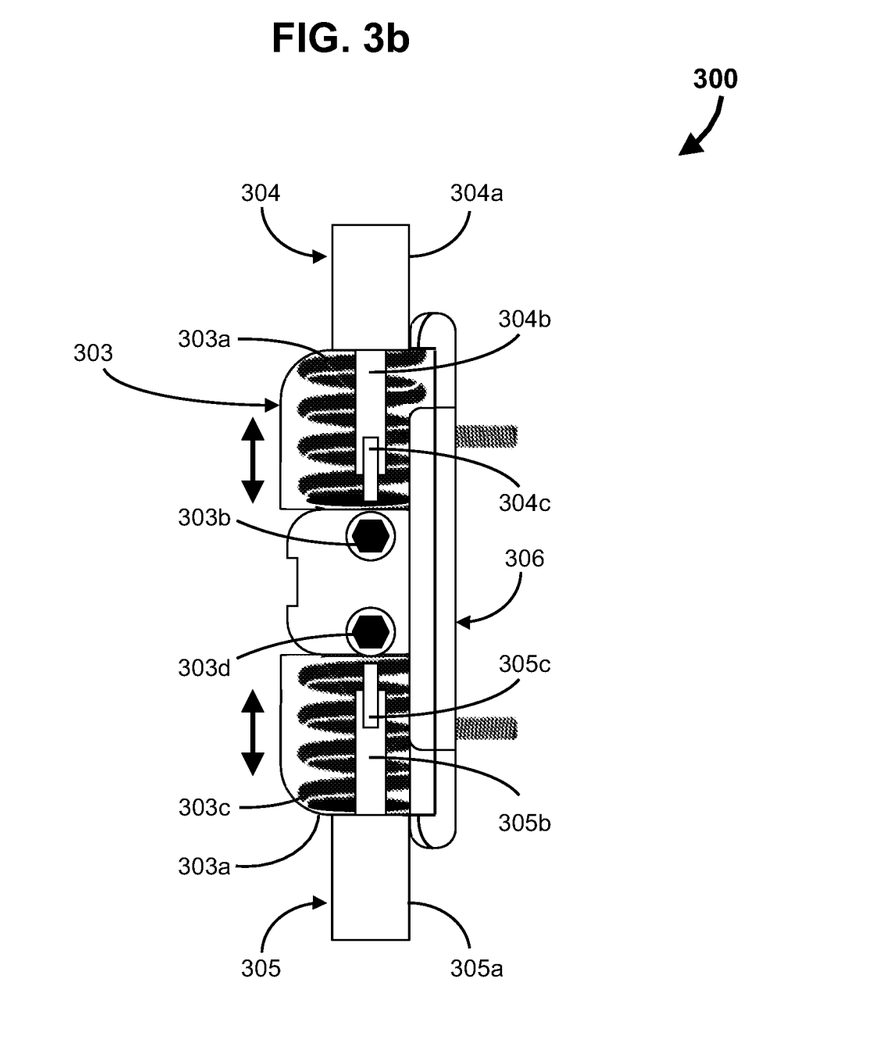
FIG. 3b is a side view of a new selective gate shown in partial cross section.

FIG. 3b generally shows and illustrates details of the present invention. FIG. 3b is not prior art. The present invention includes affixing upper and lower linear actuator assemblies 304 and 305 (also called upper and lower linear stoppers or upper and lower stoppers) to the selective gate 303. The linear actuator assemblies 304 and 305 are configured to selectively squeeze or compress the rollers 303b and 303d against the arm 302. This compression prevents or discourages the arm 302 from sliding with respect to selective gate 303 and thereby prevents or discourages the door 400 from rotating with respect to the vehicle 200. Put differently, the linear actuator assemblies 304 and 305 are configured to stop the door 400 at its current position and prevent a user from rotating the door 400.

Figure 5:
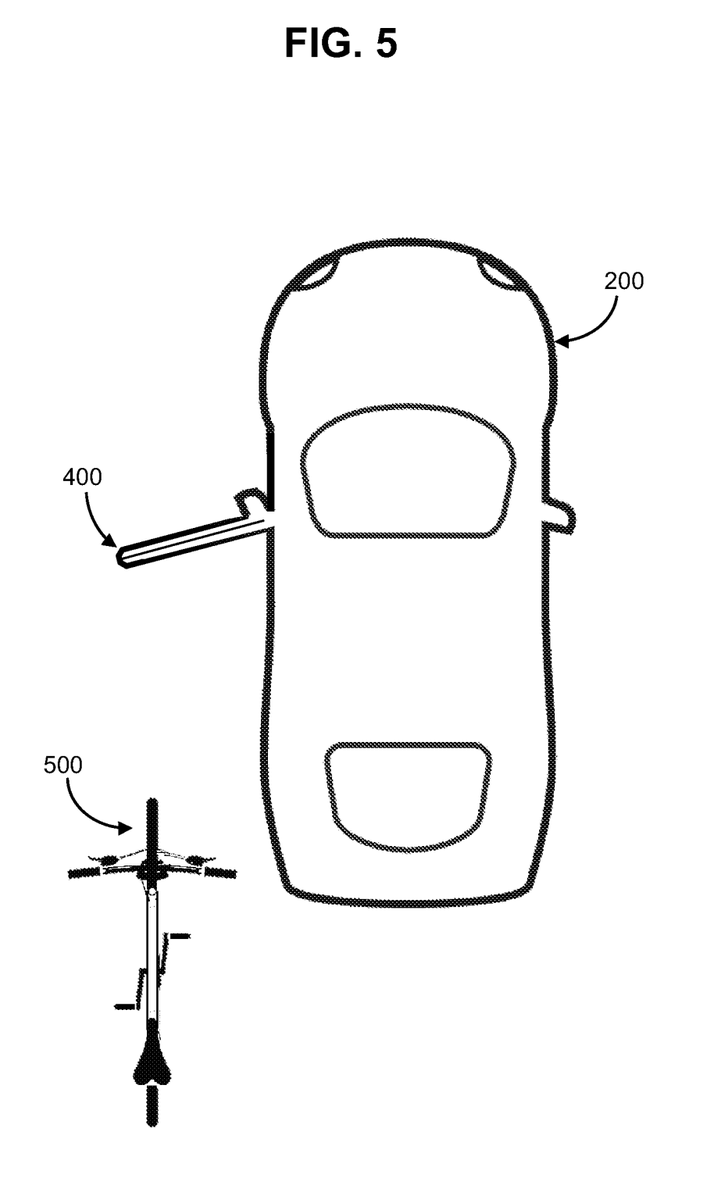
FIG. 5 is a top plan view of the vehicle with an open door.

A use case of the invention is illustrated with reference to FIG. 5. In FIG. 5, a bicyclist 500 is in danger of colliding with the vehicle door 400 in a fully open position. The present invention predicts a collision between the bicyclist 500 and the door 400 and then discourages the door 400 from opening via the linear actuator assemblies 304 and 305.

The upper linear actuator assembly 304 includes (a) an upper linear motor or solenoid 304a, (b) an upper vertical actuator 304b, and (c) an upper braking pad 304c. The lower linear actuator assembly 305 includes (a) a lower linear motor or solenoid 305a, (b) a lower vertical actuator 305b, and (c) a lower braking pad 305c.

The linear motors or solenoids 304a, 305a are configured to move or slide the vertical actuators 304b, 305b in the vertical direction. More specifically, when the upper linear motor or solenoid 304a is activated, the upper linear motor or solenoid 304a slides or motivates the upper vertical actuator 304b downward and holds the upper vertical actuator 304b in a fully extended downward position. When the lower linear motor or solenoid 305a is activated, the upper linear motor or solenoid 305a slides or motivates the lower vertical actuator 305b upward and holds the lower vertical actuator 305b in a fully extended downward position. When the linear motors or solenoids 304a, 305a are deactivated, the linear motors or solenoids: (a) retract the vertical actuators 304b, 305b and/or (b) no longer force the vertical actuators 304b, 305b to their fully extended positions (i.e., permit the vertical actuators 304b, 305b to at least partially retract under force of gravity and/or under opposing force of the rollers 303b, 303d.

The brakes 304c, 305c are configured to compress against the rollers 303b, 303d and thus prevent or discourage the upper roller 303b from moving upward under force of the arm 302 and the lower roller 303d from moving downward under force of the arm 302. The brakes 304c, 305c may be made of rubber and are affixed to the tips of the actuators 304b, 305b.

According to some embodiments, the vertical actuators 304b, 305b and the brakes 304c, 305c are accommodated in central voids of the upper and lower springs 303a, 303c. The upper spring 303a thus wraps around the upper vertical actuator 304b and the upper brake 304c when the upper vertical actuator 304b is in the fully extended position. Similarly, the lower spring 303c wraps around the lower vertical actuator 305b and the lower brake 305c when the lower vertical actuator 305b is in the fully extended position.

Returning to FIG. 3a, the upper and lower linear actuator assemblies 304, 305, when active, are configured to selectively arrest horizontal translation of the arm 302 through the selective gate 303. When the upper and lower linear actuator assemblies 304, 305 are inactive, the inhibitor 300 functions normally and as previously described.

Figure 6:
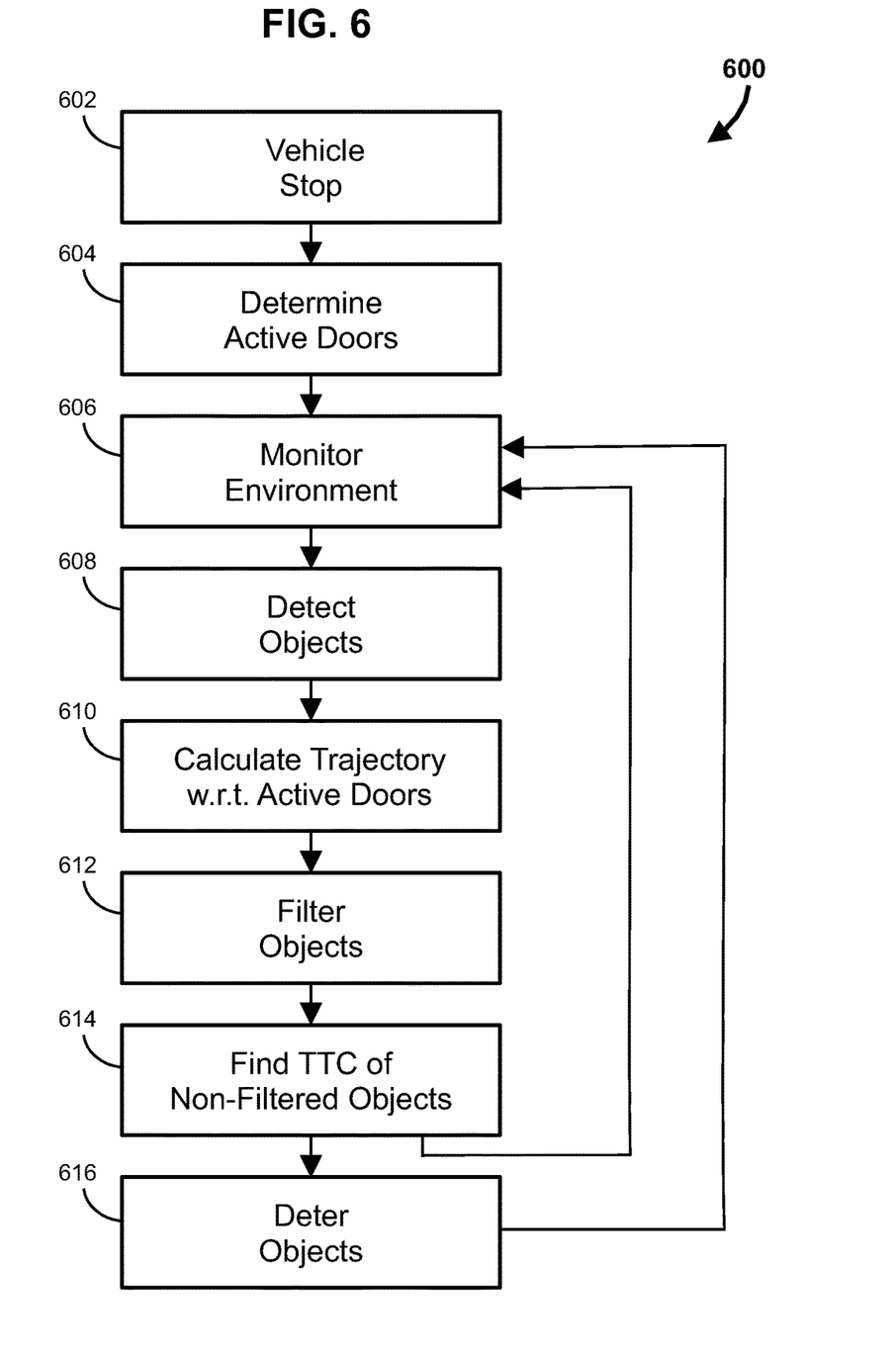
FIG. 6 is a block diagram of a method.

FIG. 6 generally shows and illustrates a method 600 of controlling the actuator assemblies 304 and 305. The method 600 is configured to (a) predict a door opening event, (b) predict an expected collision with the door, and (c) activate the actuator assemblies 304, 305 based on (a) and (b).

At block 602, the vehicle 200 detects a stopping event. The vehicle 200 may detect such an event by (a) determining that the vehicle 200 has been placed in park and/or (b) determining that the vehicle 200 has reached a velocity of zero.

At block 604, the vehicle 200 predicts opening of one or more of the doors 400 to 403. Doors predicted to have plausible probability of opening are called active doors.

The vehicle 200 predicts opening of the driver door 400 based on one or more of the following events: (a) the vehicle being placed in park, (b) the driver seatbelt transitioning from engaged to disengaged within a predetermined time period prior to the vehicle being placed in park, (c) a weight sensor in the driver seat reading a reduced amount of weight compared with a steady state weight determined when the vehicle 200 was in motion.

The vehicle 200 predicts opening of one of the front passenger door 403 based on one or more of the following events: (a) the vehicle 200 reaching a velocity of zero, (b) the front passenger seatbelt transitioning from engaged to disengaged within a predetermined time period prior to the vehicle reaching a velocity of zero, (c) a weight sensor in the front passenger seat reading a reduced amount of weight compared with a steady state weight determined when the vehicle 200 was in motion.

The vehicle 200 predicts opening of the rear left passenger door 401 based on one or more of the following events: (a) the vehicle 200 reaching a velocity of zero, (b) any of the rear seat seatbelts transitioning from engaged to disengaged within a predetermined time period prior to the vehicle reaching a velocity of zero, (c) a weight sensor in the any of the rear seats reading a reduced amount of weight compared with a steady state weight determined when the vehicle 200 was in motion.

The vehicle 200 predicts opening of the rear right passenger door 402 based on one or more of the following events: (a) the vehicle 200 reaching a velocity of zero, (b) any of the rear seat seatbelts transitioning from engaged to disengaged within a predetermined time period prior to the vehicle reaching a velocity of zero, (c) a weight sensor in the any of the rear seats reading a reduced amount of weight compared with a steady state weight determined when the vehicle 200 was in motion.

At block 606, the vehicle 200 scans or monitors the environment via the local vehicle sensors 102a to 102d. At block 608, the vehicle 200 applies readings from the local vehicle sensors 102a to 102d to detect objects surrounding the vehicle. At block 610, the vehicle 200 calculates dimensions, trajectories, positions, velocities, and/or accelerations of the detected objects. At block 612, the vehicle 200 filters the objects based on one or more of the calculated dimensions, trajectories with respect to sweeping positions of the active doors (i.e., the doors that have a plausible probability of opening), positions, velocities, and/or accelerations. More specifically, the vehicle 200 may: ignore objects with dimensions falling below a predetermined dimensional threshold (e.g., having a low surface area); ignore objects having a trajectory not intersecting the sweeping positions of the active doors; ignore objects that are at least a predetermined distance away from each of the sweeping positions of the active doors; ignore objects having velocities falling below a predetermined velocity threshold; ignore objects having accelerations falling below a predetermined acceleration threshold, the predetermined acceleration threshold being a function of (a) current distance of the object from the sweeping positions of the active door that intersects the trajectory of the object, and (b) current velocity of the object.

It should be appreciated that sweeping positions of the doors are the arc-shaped full range of possible door positions. For example, the sweeping position of the driver door 400 includes (a) the position of the door 400 when fully closed, (b) the position of the door 400 when fully open, and (c) all intermediate positions of the door. It should thus be appreciated that the sweeping position of the driver door 400 is arc-shaped with one end of the arc corresponding to the door being fully closed and the opposing end of the arc corresponding to the door being fully open. It should further be appreciated that the vehicle 200 may calculate intersections between objects and doors assuming that non-door components are complete barriers (e.g., if a bicycle is on the right side of the vehicle 200 and the trajectory of a bicycle intersects door 400 on the left side of the vehicle 200, then the vehicle 200 will disregard the intersect between door 400 and the bicycle).

At block 614, the vehicle 200 calculates a time-to-collision (TTC) between the non-filtered objects and the sweeping positions of the active doors that intersect the trajectories of the non-filtered objects (e.g., if the trajectory of a bicycle intersects door 401 and door 401 is active, then the vehicle 200 finds TTC between sweeping position of door 401 and the bicycle; if the trajectory of the bicycle intersects doors 400 and 401 and doors 400 and 401 are active, then the vehicle 200 finds TTC between each of sweeping positions of doors 400 and 401 and the bicycle. TTC is based on (a) velocity of the object, (b) position of the object with respect to the sweeping position of the door, (c) acceleration of the object, and/or (d) heading of the object with respect to the sweeping position of the door. Calculation of TTC is described in U.S. patent application Ser. No. 15/183,355 to Bidner, which is hereby incorporated by reference in its entirety.

If the TTC is above a predetermined threshold value, then the vehicle 200 returns to block 606, causing the method 600 to cycle or repeat. The vehicle 200 may cycle the method 600 for a predetermined amount of cycling time. The vehicle 200 may cycle the method 600 until (a) at least one door has been opened, (b) none of the seat weight sensors have measured a weight consistent with a human passenger for at least a predetermined amount of time, and/or (c) values returned by the seat weight sensors have remained constant (within a predetermined degree e.g., ±5%) for at least a predetermined amount of time.

If the TTC falls below a predetermined threshold time value, then the vehicle 200 proceeds to block 616 and takes one or more actions. The actions may include (a) activating the linear actuator assemblies 304, 305 of the inhibitors corresponding to the active doors associated with the TTCs below the predetermined threshold time value; (b) flashing a light, siren, or playing an audio message to deter the external object; (c) displaying or sounding an internal warning in the vehicle. Thereafter, the vehicle 200 returns to block 606 and repeats the cycle.

While repeating the cycle, the vehicle 200 may continue to apply the above actions until returning to the next iteration of block 616. If the next iteration of block 616 does not include the same actions, then the vehicle 200 terminates the currently active actions that are missing from the new iteration of block 616.

According to some embodiments, the vehicle 200 may automatically deactivate the linear actuator assemblies 304, 305 upon (a) a user command via the user interface 105, (b) detecting repeated attempts (e.g., at least two attempts or at least three attempts) to open the door corresponding to said linear actuator assemblies 304, 305. The vehicle 200 may determine condition (b) by recording, through suitable sensors, an amount of force applied against one or both the vertical actuators 304b, 305b. If the force exceeds a predetermined force at least a predetermined number of times (e.g., one time or three times), then the vehicle 200 may automatically deactivate said linear actuator assemblies 304, 305.

According to some embodiments, the vehicle may determine condition (b) by sensing or recording an angular position of the door handle. If the vehicle detects that the door handle has rotated from its resting position (i.e., flush or parallel with the vehicle door) the predetermined number of times, then the vehicle may automatically deactive said linear actuator assemblies 304, 305.

The invention claimed is:

1. A vehicle comprising:
a frame, a door;
an arm including a plurality of valleys and configured to slide through upper and lower rollers biased against the arm when the door rotates;
upper and lower stoppers configured to, upon activation, compress the upper and lower rollers against the arm, thus stopping rotation of the door; and
sensors, processor(s) configured to: activate and deactivate the stoppers based on sensed events.

2. The vehicle of claim 1, wherein the door is configured to rotate and pivot about the frame; wherein the arm, the upper and lower rollers, and the upper and lower stoppers are configured to rotate and pivot about the frame; wherein the the upper and lower rollers, and the upper and lower stoppers are fixed to the door.

3. The vehicle of claim 1, wherein the upper stopper comprises: (a) an upper linear motor or solenoid, (b) an upper vertical actuator, and (c) an upper brake.

4. The vehicle of claim 3, further comprising upper and lower springs respectively biasing the upper and lower rollers against the arm and configured such that the upper vertical actuator extends through a central axis of the upper spring when the upper stopper is active.

5. The vehicle of claim 3, configured such that upon activation of the upper stopper, the upper linear motor or solenoid extends the upper vertical actuator downward, which drives the upper brake against the upper roller.

6. The vehicle of claim 5, configured such that, upon activation of the upper stopper, the upper stopper drives the upper brake against the upper roller until the upper stopper is deactivated.

7. The vehicle of claim 3, wherein the lower stopper comprises: (a) a lower linear motor or solenoid, (b) a lower vertical actuator, and (c) a lower brake.

8. A vehicle comprising:
a door;
an inhibitor comprising:
upper and lower stoppers configured to, upon activation, compress upper and lower rollers against an arm, thus limiting rotation of the door, the arm including a plurality of valleys and configured to slide through the upper and lower rollers when the door rotates; and
sensors, processor(s) configured to: activate and deactivate the stoppers based on sensed events.

9. The vehicle of claim 8, wherein the processor(s) are configured to:
determine that a calculated trajectory of a detected object intersects the door;
activate the stoppers based on the determination.

10. The vehicle of claim 9, wherein the processor(s) are configured to:
determine the intersection of the trajectory of the detected object with the door based on a sweeping position of the door.

11. The vehicle of claim 10, wherein the sweeping position of the door is arced and includes a closed position of the door, a fully open position of the door and intermediate positions of the door.

12. The vehicle of claim 9, wherein the processor(s) are configured to:
determine that the door is active with reference to seatbelt sensor(s) or seat load sensor(s);
only calculate the trajectory of the detected object with reference to the door when the door is determined active.

13. The vehicle of claim 8, wherein the door is a driver door and the inhibitor is a driver door inhibitor, the vehicle comprises a passenger door connected to a passenger door inhibitor, and the processor(s) are configured to:
determine that the passenger door is active with reference to passenger seatbelt sensor(s) or passenger seat load sensor(s);
determine that a calculated trajectory of a detected object intersects the passenger door, but only when the passenger door is active;
activate stoppers of the passenger door inhibitor based on the determination.

14. The vehicle of claim 8, wherein the processor(s) are configured to:
measure load applied against the stoppers;
deactivate the stoppers when the measured load exceeds a predetermined value a predetermined number of times.

15. A method of stopping a rotatable door of a vehicle including sensors, the door and an inhibitor having: upper and lower stoppers configured to, upon activation, compress upper and lower rollers against an arm including a plurality of valleys and configured to slide through the upper and lower rollers, thus stopping rotation of the door; the method comprising, via processor(s) of the vehicle:
sensing, using the sensors, sensed events; and
activating and deactivating the stoppers based on the sensed events.

16. The method of claim 15, comprising:
determining that a calculated trajectory of a detected object intersects a sweeping position of the door;
activating the stoppers based on the determination.

17. The method of claim 16, wherein the sweeping position of the door is arced and includes a closed position of the door, a fully open position of the door and intermediate positions of the door.

18. The method of claim 15, comprising:
determining that the door is active with reference to seatbelt sensor(s) or seat load sensor(s);
only calculating the trajectory of the detected object with reference to the door when the door is determined active.

19. The method of claim 15, wherein the door is a driver door and the inhibitor is a driver door inhibitor, the vehicle includes a passenger door connected to a passenger door inhibitor, and the method comprises:
determining that the passenger door is active with reference to passenger seatbelt sensor(s) or passenger seat load sensor(s);
determining that a calculated trajectory of a detected object intersects the passenger door, but only when the passenger door is active;

activating stoppers of the passenger door inhibitor based on the determination.

20. The method of claim 15, comprising:
measuring load applied against the stoppers;
deactivating the stoppers when the measured load exceeds a predetermined value a predetermined plurality of times.

* * * * *